United States Patent Office 3,494,657
Patented Feb. 10, 1970

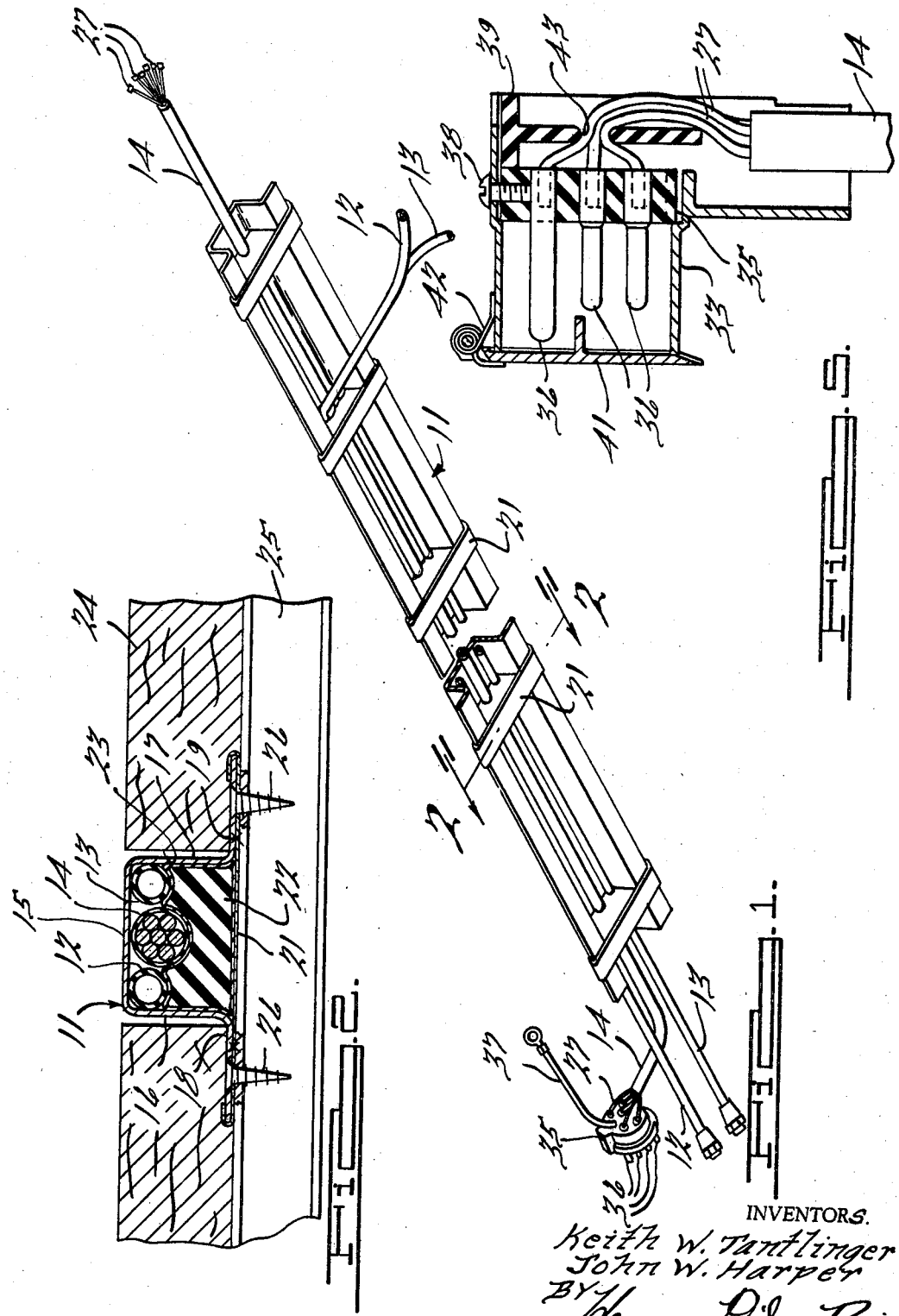

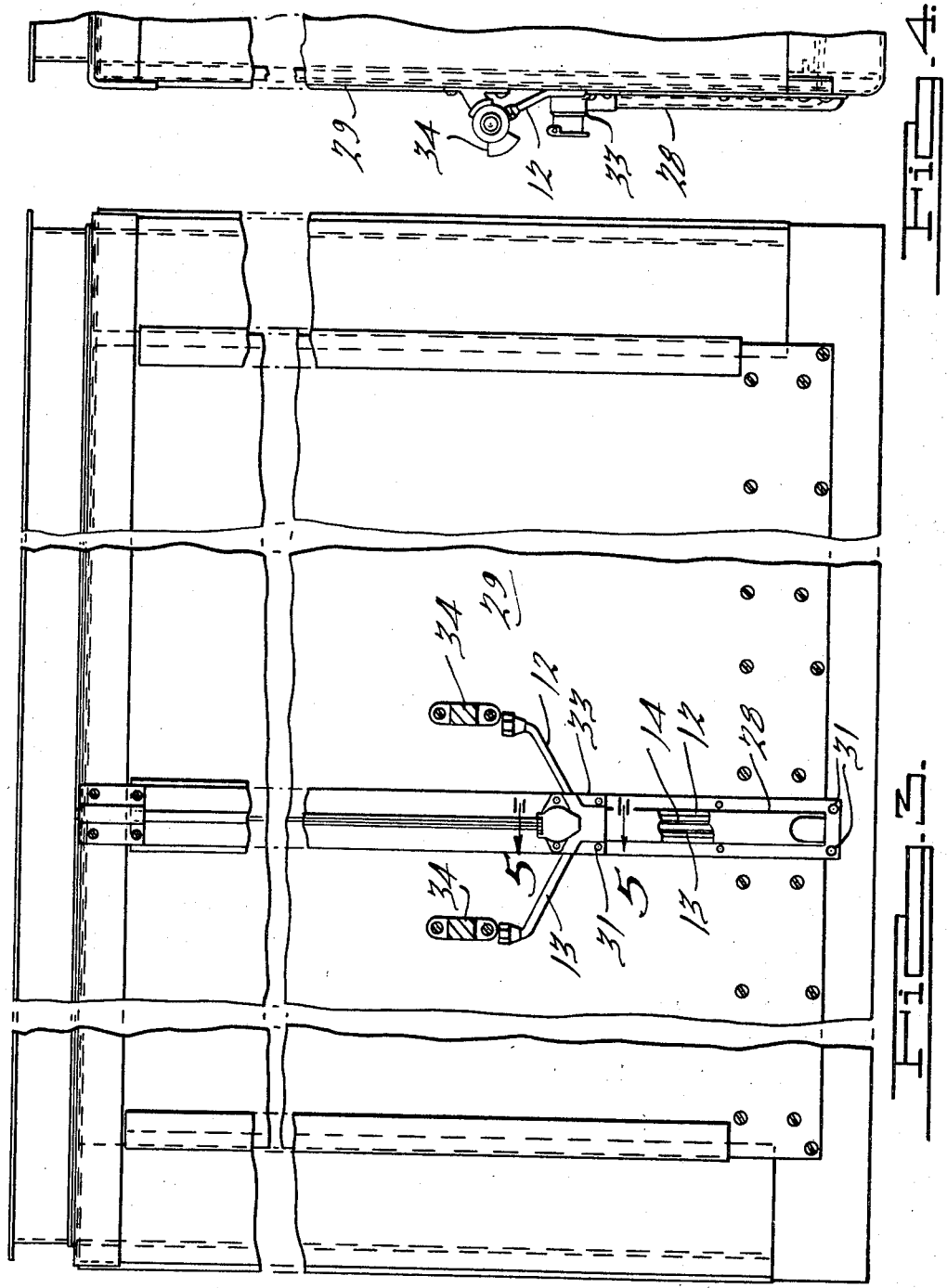

3,494,657
DUCT FOR THE POWER SUPPLY CONDUITS OF A TRAILER CARRIED IN THE TRAILER FLOOR
Keith W. Tantlinger, Grosse Pointe Shores, and John W. Harper, Detroit, Mich., assignors to Fruehauf Corporation, a corporation of Michigan
Continuation of application Ser. No. 585,002, Oct. 7, 1966. This application Mar. 11, 1969, Ser. No. 809,469
Int. Cl. B62d 27/00; H01r 33/00; H01b 7/00
U.S. Cl. 296—28                                   5 Claims

ABSTRACT OF THE DISCLOSURE

A channel-shaped duct for trucks or trailers has laterally extending flanges which are secured to the cross members upon which the floor sections are supported, with the open face of the channel presented downwardly and located between the floor sections which rest upon the lateral flanges. Electrical conductors and fluid conduits are supported within the duct by spaced insulating elements which are supported on transverse braces secured to the bottom edges of the duct. The forward ends of these conductors and conduits extend beyond the front wall of the truck or trailer and upwardly therealong. Closure means is provided at the end of the duct on the front wall and a housing is provided on the front wall which contains a terminal plug to which said conductors are attached.

---

The present application is a continuation of the application to K. W. Tantlinger et al., Ser. No. 585,002, filed Oct. 7, 1966, which is now abandoned.

Heavy duty vehicles such as van-type trucks, trailers and the like, are constructed in various configurations according to the particular type of load which each is intended to carry. Thus, a refrigeration truck, for example, would be constructed with insulated wall, roof and floor panels. In trucks and trailers heretofore known and used, air brake lines and electrical cables leading from the tractor or truck cab at the front end of the vehicle generally have been placed under the floor of the vehicle or permanently built into the walls, roof or floor of the vehicle in accordance with the differing design requirements of vehicles carrying various types of loads. However, disposition of the air lines and electrical cables within various portions of the vehicle walls, roof or floor renders the lines and cables relatively difficult to service or subjects them to the deleterious effects of rain, snow, mud and flying debris.

The aforementioned problem is solved, in accordance with a trailer construction of the present invention, by a novel floor duct construction that may be separately manufactured and subsequently installed as a unit within a recess in a vehicle floor. The floor duct of the present invention is open along its bottom portion to permit ready access to the lines and cables contained therein. The floor duct provides a protection to the lines and cables by a resilient restraining means which secures the lines and cables within a protective metal channel.

Accordingly, one object of the present invention is an improved floor duct construction for the protection and housing of such conveying means as air brake lines or electrical cables in a heavy duty truck, trailer or the like.

Another object is a duct construction that is protectively disposed in a recess in a vehicle floor so as to avoid damage due to shifting of a load within the vehicle and to exposure to deleterious forces of the exterior environment.

Another object is a duct construction that provides ready access to the conveying means housed therein.

Another object is a duct construction that is separately manufactured and subsequently installed as a unit within vehicles of various configurations without the need for modification to conform therewith.

Other objects and advantages of the present invention will be apparent from the following description, claims and drawings, wherein:

FIGURE 1 is a perspective view of a floor duct construction embodying features of the present invention;

FIG. 2 is an enlarged sectional view of the structure illustrated in FIG. 1, taken on the line 2—2 thereof;

FIG. 3 is a front elevational view of a van-type semi-trailer body embodying features of the present invention;

FIG. 4 is a side elevational view of the structure illustrated in FIG. 3; and

FIG. 5 is an enlarged sectional view of the structure illustrated in FIG. 3, taken on the line 5—5 thereof.

As best seen in FIGURES 1 and 2 of the drawings, a metal duct 11 of channel-shaped cross section houses air-brake lines 12 and 13, and an electrical cable 14. The cross section of the ducts 11 is defined by a bight portion 15, downwardly extending leg portions 16 and 17, and oppositely-directed flange portions 18 and 19. Bracing members 21 are disposed at regular intervals along the duct 11 and are secured thereto by being crimped around the flanges 18 and 19. A weld may be provided at the crimp pint for additional strength. The air lines 12 and 13 and the electrical cable 14 are held firmly against the bight and leg portions 15, 16 and 17 of the duct 11 by retention cushions 22 composed of resilient material such as sponge rubber so as not to damage the lines 12 and 13 or cable 14 at the points of contact therewith. The duct 11 is disposed within a recess 23 along a vehicle floor 24, and is secured to transverse chassis members 25 by a plurality of self-tapping screws 26. It will be noted that the bight portion 15 of the duct 11 is flush with the upper surface of the floor 24 so as to avoid damage due to shifting of a load thereon, and that the lines 12 and 13 and cable 14 are positioned deeply enough within the duct to avoid exposure to most of the deleterious forces of the exterior environment.

At or near the rearward end of the vehicle floor 24, the air-brake lines 12 and 13 are led out of the duct 11 and are connected to their respective brake systems as provided in the art. The electrical cable 14 terminates at its rearward end in a plurality of wires 27 which are led to their respective electrical systems such as rear, back-up and turn indicating lights. At the forward end of the vehicle floor 24, as seen in FIGS. 3 and 4, the air-brake lines 12 and 13 and the electrical cable 14 are led out of the duct 11 and up through a duct extension 28 of channel-shaped cross section which is fastened to a vehicle front wall 29 by means of screws 31. The electrical cable 14 terminates in a housing 33, which is secured to the front wall 29 by screw 31, and the air-brake lines 12 and 13 are led laterally out of 34, which are likewise secured to the front wall 29.

As best seen in FIGS. 1 and 5, the wires 27 are led from the forward end of the cable 14 to be individually secured to an electrical plug 35 which is provided with a plurality of male plug elements 36 and a ground wire 37. The plug 35 is held within the housing 33 by a screw 38, and a filler 39 of insulating material is secured behind the plug 35 within the housing 33. When not in use, the male plug elements 36 are protected by a housing door 41 held shut by a spring 42. Within the housing 33, the wires 27 of the cable 14 are led through an aperture 43 in the filler 39 to be conductively secured to the rear portions of their respective male plug elements 36. In general, the housing and air coupling elements are so devised as to provide a means of quick and secure attachment of electrical and air lines from a tractor or truck cab to a trailer.

What is claimed is:

1. In a trailer having a frame containing cross members on which floor sections are supported and on which a front wall is supported, a duct having a channel-shaped cross section embodying a web, side flanges and outwardly extending flanges at the edge of said side flanges, means securing the outwardly extending flanges of said duct to said cross members between said floor sections which rest upon the cross members and outwardly extending flanges with the open portion of the duct between the side flanges facing downwardly, and spaced means within the duct in engagement with the inner faces of the side flanges supporting lengths of power carrying means which are visible at all times in the open portions of the duct between the cross members and said spaced means.

2. In a trailer as recited in claim 1, wherein said power carrying means consist of electric conductors and fluid conduits.

3. In a trailer as recited in claim 2, wherein the forward end of the conductors and conduits extend beyond said front wall, and closure means at the end of said duct extending upwardly along the front wall of the trailer, and means for securing said closure means to said front wall.

4. In a trailer as recited in claim 3, wherein a terminal plug is provided to which said conductors are attached, and a housing enclosing said terminal plug and supported on said closure means to which said conduits are secured.

5. In a trailer having a front wall and a floor, a duct having a channel-shaped cross section embodying a web and side flanges, means supporting said duct below the surface of the trailer floor with the open portion facing downwardly, spaced means within said duct supporting electrical conductors and fluid conduits therein with the ends thereof extending beyond the end of the duct located adjacent to the front wall, closure means at said end of the duct retaining said conductors and conduits on the front wall of the trailer, means securing said closure means to the trailer front wall, a terminal plug to which said conductors are attached, a housing enclosing said terminal plug having openings through which said conduits extend, and means securing said housing to said closure means.

References Cited

UNITED STATES PATENTS 2,165,691 7/1939 Bell _____ 105—422 X
3,279,823 10/1966 Thouvenelle et al. ___ 280—421

FOREIGN PATENTS 1,158,564 1/1958 France.

LARAMIE E. ASKIN, Primary Examiner

U.S. Cl. X.R.

105—422; 174—47, 49, 99; 280—421, 422; 339—10